(12) United States Patent
Batdorff

(10) Patent No.: US 8,696,002 B1
(45) Date of Patent: Apr. 15, 2014

(54) ROLL CENTER HEIGHT VARIATOR

(71) Applicant: International Truck Intellectual Property Company, Lisle, IL (US)

(72) Inventor: Jonathan Dale Batdorff, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/848,254

(22) Filed: Mar. 21, 2013

(51) Int. Cl.
*B60G 21/05* (2006.01)
*B60G 9/02* (2006.01)

(52) U.S. Cl.
CPC .................................... *B60G 21/051* (2013.01)
USPC ...... 280/124.106; 280/124.116; 280/124.128; 280/5.509; 267/140.11; 296/190.07

(58) Field of Classification Search
CPC ........... B60G 21/051; B60G 2200/342; B60G 2200/346; B60G 2200/34; B60G 2204/129; B60G 2204/421; B60G 2206/12
USPC ......... 280/124.106, 124.116, 124.128, 5.509; 267/140.11; 296/190.07
See application file for complete search history.

(56) References Cited

U.S. PATENT DOCUMENTS

| | | | |
|---|---|---|---|
| 4,550,926 A * | 11/1985 | MacIsaac .................... | 280/5.509 |
| 6,142,494 A * | 11/2000 | Higuchi ..................... | 280/93.51 |
| 7,229,094 B2 * | 6/2007 | Miller et al. .................. | 280/677 |
| 7,338,057 B2 * | 3/2008 | Kropfl et al. ........... | 280/124.134 |
| 7,651,133 B2 | 1/2010 | Branning | |
| 7,695,054 B2 * | 4/2010 | Haeusler et al. ......... | 296/190.07 |
| 7,717,441 B2 | 5/2010 | Rochester | |
| 7,950,727 B2 * | 5/2011 | Haeusler et al. ......... | 296/190.07 |
| 8,276,276 B2 | 10/2012 | Cordea | |
| 8,424,913 B1 | 4/2013 | Schunke | |
| 2011/0095569 A1 * | 4/2011 | Haeusler et al. ......... | 296/190.07 |
| 2011/0248464 A1 * | 10/2011 | Buhl et al. ............. | 280/124.108 |
| 2011/0309593 A1 * | 12/2011 | Stoff et al. ............. | 280/124.106 |
| 2012/0098296 A1 * | 4/2012 | Lorenz et al. ............ | 296/190.07 |

\* cited by examiner

*Primary Examiner* — Toan To
*Assistant Examiner* — Darlene P Condra
(74) *Attorney, Agent, or Firm* — Jeffrey P. Calfa; Mark C. Bach

(57) ABSTRACT

A roll center variator is described, generally including a first transverse locating device, a second transverse locating device, an adjustable spacing mechanism, and first and second simple links attached to the spacing mechanism and a vehicle axle. Each of the transverse locating devices has two ends attached to opposing sides of a vehicle frame. The spacing mechanism is attached at a first point to the first locating device and at a second point to the second locating device. The first and second locating devices are comprised of a Watt's linkage, Panhard rod, or other transverse locating device. The variator includes a screw-threaded rod engaged with the spacing mechanism, wherein rotation of the rod in one direction increases a distance between a first point and a second point of the spacing mechanism and rotation in the opposite direction decreases the distance between the same two points.

15 Claims, 2 Drawing Sheets

ROLL CENTER HEIGHT VARIATOR

TECHNICAL FIELD

The present device relates to a roll center height variator for a vehicle. Specifically, the variator facilitates adjustment of a vehicle roll center height to reduce vehicle roll generated during cornering and for quick and infinite variability when used for testing.

BACKGROUND

Discussion of the suspension of a vehicle refers to the system of springs, shock absorbers and linkages that connects a vehicle to its wheels. Vehicle suspension systems serve a dual purpose—(1) contributing to the road holding/handling and braking of the vehicle for safety and driving pleasure, and (2) keeping vehicle occupants comfortable and reasonably isolated from road noise, bumps, vibrations, and the like. These two goals are generally at odds, so the tuning of suspensions involves finding the right compromise for each vehicle.

On the one hand, it is important for the suspension to keep the road wheels in contact with the road surface as much as possible, because all the forces acting on the vehicle do so through the contact patches of the tires. On the other hand, the suspension is intended to dissipate the translation of noise, ruts, bumps, vibration, and the like to protect the vehicle itself, and any cargo or luggage, from damage and wear. Often the designs used for the front and rear suspension of a vehicle, as well as any trailer in tow, are different.

Watt's linkage is one type of suspension used in the rear axle of some vehicles as an improvement over the Panhard rod, which was designed in the early twentieth century. Both methods intend to prevent relative sideways motion between the axle and body of the vehicle. Watt's linkage approximates a vertical straight line motion more closely, and does so while fixing the location of the center of the axle rather than toward one side of the vehicle, as more commonly used when fitting a long Panhard rod.

As shown in FIG. 1, Watt's linkage consists of two horizontal bars of equal length mounted at each side of the chassis. Between these two bars, a short vertical bar is connected. The center of this short vertical bar—the point which is constrained in a nearly straight line motion—is typically mounted to the center of the axle. All pivoting points are free to rotate in a vertical plane.

In a way, Watt's linkage can be seen as two Panhard rods mounted opposite each other. In Watt's arrangement, however, the opposing curved movements introduced by the pivoting Panhard rods are compensated by the short vertical rotating bar.

The problem is that these devices do not allow for corresponding adjustments due to changes in the vehicle center of gravity (Cg) height, load height, or other important variables. Current devices also do not allow for a roll center that is significantly higher than the frame rails of the vehicle. Finally, current designs do not facilitate using the transverse locating device for testing the effects of changing roll center to Cg induced moments. Rather, current devices require the driver to use a great deal of their attention to determine the appropriate cornering speed. This generally results in a greatly reduced speed and therefore increases transportation costs. A great deal of expensive time is required to change out all the suspension components required for installing the current types of devices used to determine differing roll center heights.

The present device solves these and other problems associated with current vehicle suspension systems.

SUMMARY

A roll center variator is described, generally including a first transverse locating device, a second transverse locating device, an adjustable spacing mechanism, and first and second simple links attached to the spacing mechanism and the vehicle axle. Each of the transverse locating devices has two ends attached to opposing sides of a vehicle frame and each is positioned in the same plane. The adjustable spacing mechanism is attached at a first point to the first transverse locating device and at a second point to the second transverse locating device.

In a specific embodiment of the roll center variator, each of the first and second transverse locating devices comprises one of either a Watt's linkage, Panhard rod, or other transverse locating device. The variator includes a screw-threaded rod threadably engaged with the adjustable spacing mechanism, wherein rotation of the rod in one direction increases a distance between a first point and a second point of the spacing mechanism and rotation in the opposite direction decreases the distance between the first point and the second point.

In a more specific embodiment, the roll center variator uses a scissor jack-like device for the adjustable spacing mechanism. Generally speaking, the adjustable spacing mechanism is configured to adjust an angle formed between the first simple link and the second simple link. The adjustable spacing mechanism is also configured to adjust a height of a formed vertex of an angle formed between the first simple link and the second simple link. The vertex may be positioned either above the top of the vehicle frame or below the top of the vehicle frame.

In yet another specific embodiment, a roll center variator includes a first Watt's linkage having each of two ends attached to opposing sides of a vehicle frame, a second Watt's linkage having each of two ends attached to opposing sides of the vehicle frame, wherein the second Watt's linkage is positioned in the same plane as the first Watt's linkage, an adjustable spacing mechanism attached at a first point to a link of the first Watt's linkage and at a second point to a link of the second Watt's linkage, a first simple link attached by one end to the adjustable spacing mechanism and by another end to a first end of the vehicle axle, and a second simple link attached by one end to the adjustable spacing mechanism and by another end to a second end of the vehicle axle.

These and other embodiments and advantages of the device will be more readily apparent from a reading of the detailed description in combination with the appended drawing figures.

DETAILED DESCRIPTION

Figure 1:
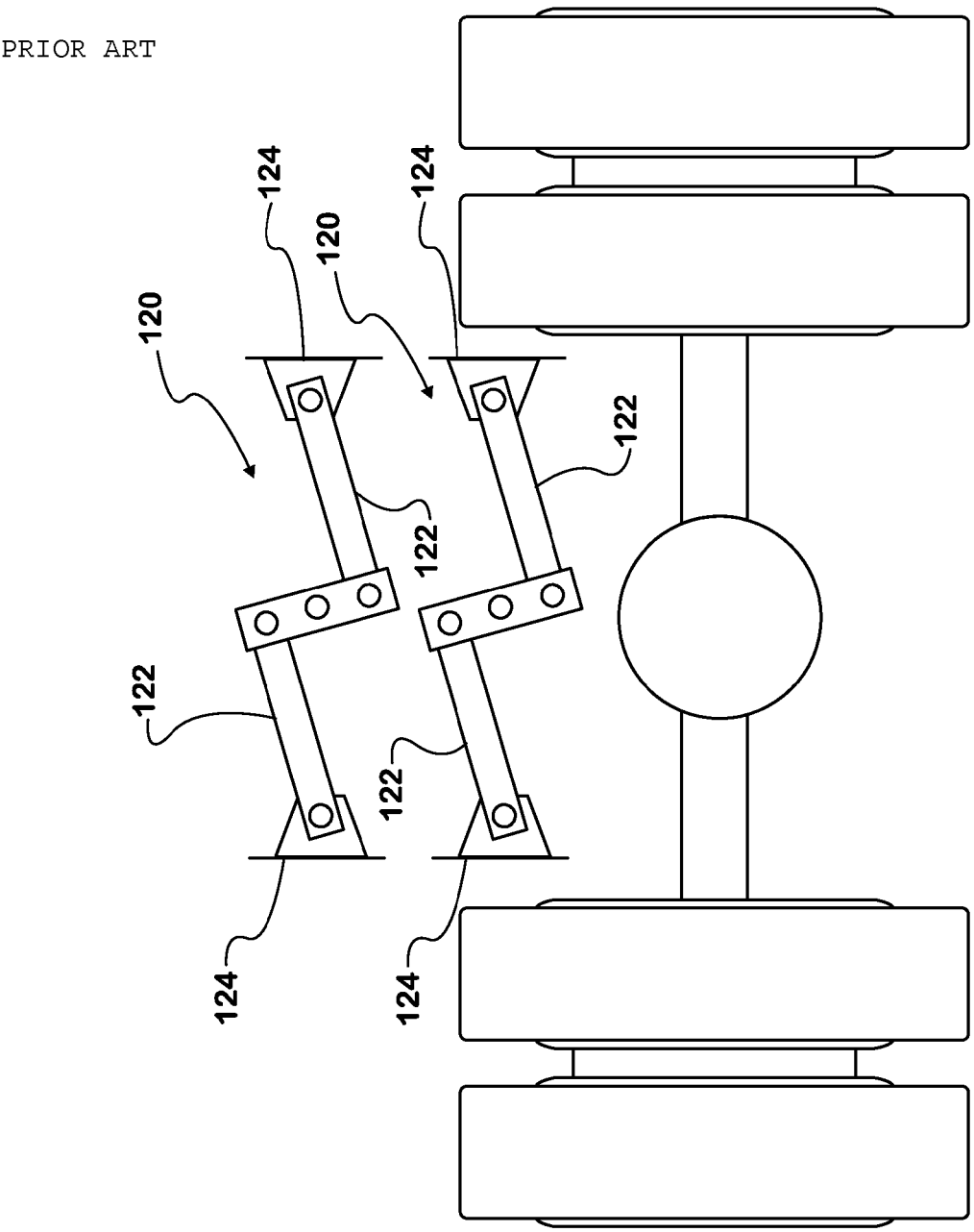
FIG. 1 is a rear schematic illustrating dual Watt's linkage used in the prior art systems.

Referring to FIG. 1, a dual Watt's linkage 120 is illustrated showing the outer bars 122 connected to the frame rail 124 of a vehicle (not shown). This is a common configurations used in prior art vehicle suspensions. Among other problems, the illustrated configuration and other prior art devices do not (1) allow for corresponding adjustments due to changes in vehicle Cg height, load height, or other variables, (2) allow for a roll center that is significantly higher than the frame rails, and (3) facilitate using transverse locating device for testing the effects of changing roll center to Cg induced moments.

Figure 2:
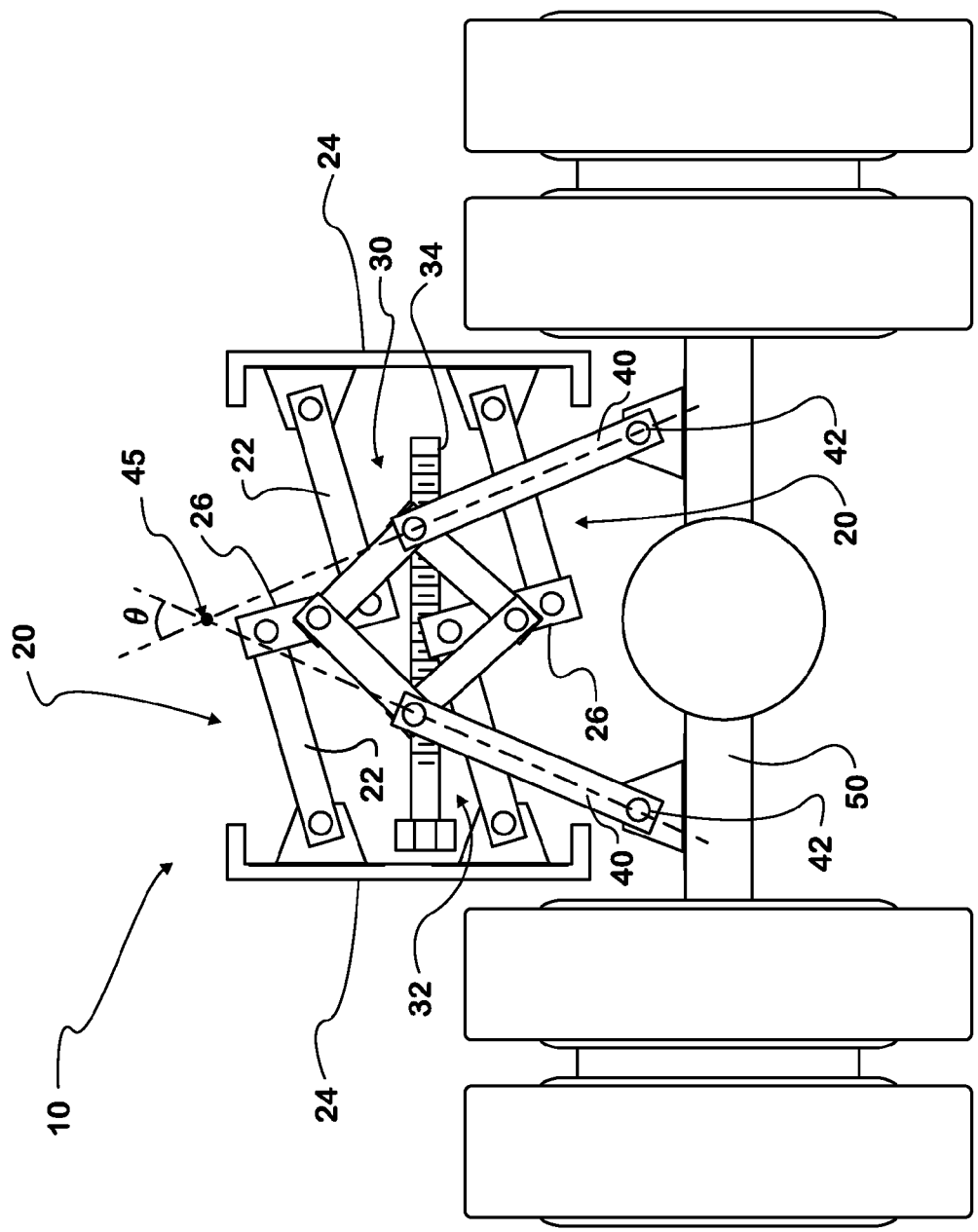
FIG. 2 is a rear schematic illustrating an embodiment of the present system.

Referring now to FIG. 2, an embodiment of the present roll center variator 10 is illustrated. This configuration includes a dual Watt's linkage 20 as shown in FIG. 1. The outer arm bars 22 are each connected to the frame rail 24 of a vehicle (not shown). The two Watt's linkage 20 are arranged in the same plane. Other transverse locating devices, such as the more common Panhard rod (not shown), may be used in place of the Watt's linkage 20 and the variator 10 would function the same way.

Attached at a center of the two middle links 26 of the Watt's linkage 20 is an adjustable spacing mechanism 30. Illustrated is a diamond-shaped device having the upper and lower geometric points fastened to a center point of the middle links 26 of the Watt's linkage 20. Adjustably connected to the side geometric points of the spacing mechanism 30 is an adjustment mechanism 32. In the embodiment illustrated of FIG. 2, the adjustment mechanism 32 is a threaded screw-type rod 34. In fact, the entire adjustable spacing mechanism 30 is comprised of a scissor jack as is commonly used to raise a vehicle to, for example, change a tire.

The threaded rod 34 is fixed at one of the points and threads through an inside-threaded component (not shown) at the other point, such that turning the rod 34 in one direction brings the two points closer together and turning the rod 34 in the opposite direction moves the two points farther apart. Any mechanism which is capable of readily moving the two points toward one another and apart, should be effective for use with the disclosed variator 10.

Also attached at each of the outer geometric points of the spacing mechanism 30 is a simple link 40. These two links 40 are then fixed by a pivot 42 to ends of the vehicle axle 50. As illustrated by the dashed lines, an angle formed between the two simple links 40 results in a vertex 45 which may be moved by changing the resulting angle ($\theta$) of the simple links 40. The vertex 45 may be adjusted to be above or below the top of the frame rails 24. Each of the connections made between the linkage, the adjustment mechanism and the simple links is a pivoting joint.

In operation, the threaded screw-type rod 34 is moved to adjust the vertex 45. By turning the rod 34 in one direction moves the two outer points together and pushes the top and bottom points of the adjustable spacing mechanism 30 away from one another to increase the distance between them. This effectively lowers the vertex 45. Conversely, turning the rod in the opposite direction will move the two outer points further apart and decrease the distance between the top and bottom points of the adjustable spacing mechanism 30. The vertex 45 is thereby raised as a result of the change in angle of the simple links 40.

The disclosed roll center variator 10 reduces (and may eliminate) vehicle roll while cornering. Variator 10 provides multiple roll center heights for production and testing purposes. Simultaneously, the variator 10 reduces the requirement placed on the driver while driving, allows for the appropriate cornering speed to be achieved, and reduces the time to test the effects of various roll center heights on a vehicle. The variator 10 is applicable, with possible modifications, to any current axle, suspension and chassis.

What is claimed is:

1. A roll center variator comprising:
a first Watt's linkage having each of two ends attached to opposing sides of a vehicle frame;
a second Watt's linkage having each of two ends attached to opposing sides of the vehicle frame, wherein the second Watt's linkage is positioned in the same plane as the first Watt's linkage;
an adjustable spacing mechanism attached at a first point to a link of the first Watt's linkage and at a second point to a link of the second Watt's linkage;
a first simple link attached by one end to the adjustable spacing mechanism and by another end to a first end of a vehicle axle; and
a second simple link attached by one end to the adjustable spacing mechanism and by another end to a second end of the vehicle axle.

2. The roll center variator of claim 1, further comprising a screw-threaded rod threadably engaged with the adjustable spacing mechanism, wherein rotation of the rod in one direction increases a distance between the first point and the second point of the spacing mechanism and rotation in the opposite direction decreases the distance between the first point and the second point.

3. The roll center variator of claim 2, wherein the adjustable spacing mechanism is a scissor jack.

4. The roll center variator of claim 1, wherein the adjustable spacing mechanism is configured to adjust an angle formed between the first simple link and the second simple link.

5. The roll center variator of claim 1, wherein the adjustable spacing mechanism is configured to adjust a height of a formed vertex of an angle formed between the first simple link and the second simple link.

6. The roll center variator of claim 5, wherein the vertex is above the top of the vehicle frame.

7. The roll center variator of claim 5, wherein the vertex is below the top of the vehicle frame.

8. A roll center variator comprising:
a first transverse locating device having each of two ends attached to opposing sides of a vehicle frame;
a second transverse locating device having each of two ends attached to opposing sides of the vehicle frame, wherein the second transverse locating device is positioned in the same plane as the first transverse locating device;
an adjustable spacing mechanism attached at a first point to the first transverse locating device and at a second point to the second transverse locating device;
a first simple link attached by one end to the adjustable spacing mechanism and by another end to a first end of a vehicle axle; and
a second simple link attached by one end to the adjustable spacing mechanism and by another end to a second end of the vehicle axle.

9. The roll center variator of claim 8, wherein each of the first and second transverse locating devices comprises a Watt's link.

10. The roll center variator of claim 8, wherein each of the first and second transverse locating devices comprises a Panhard rod.

11. The roll center variator of claim 8, further comprising a screw-threaded rod threadably engaged with the adjustable spacing mechanism, wherein rotation of the rod in one direction increases a distance between the first point and the second point of the spacing mechanism and rotation in the opposite direction decreases the distance between the first point and the second point.

12. The roll center variator of claim 11, wherein the adjustable spacing mechanism is configured to adjust a height of a formed vertex of an angle formed between the first simple link and the second simple link.

13. The roll center variator of claim 8, wherein the adjustable spacing mechanism is a scissor jack.

14. The roll center variator of claim 8, wherein the adjustable spacing mechanism is configured to adjust an angle formed between the first simple link and the second simple link.

15. The roll center variator of claim 8, wherein the adjustable spacing mechanism is configured to adjust a height of a formed vertex of an angle formed between the first simple link and the second simple link.

* * * * *